United States Patent

Fuchs et al.

[15] 3,686,939

[45] Aug. 29, 1972

[54] STYLUS TRACKING FORCE GAUGE

[72] Inventors: Robert J. Fuchs, Prospect Heights; James P. Thomsen, Mount Prospect; Bernhard W. Jakobs, Chicago, all of Ill.

[73] Assignee: Shure Brothers Incorporated

[22] Filed: Dec. 17, 1970

[21] Appl. No.: 99,009

[52] U.S. Cl. ..................73/141 R, 177/245, 177/246

[51] Int. Cl ..........................................G01e 5/00

[58] Field of Search..73/141 R, 141 A, 141 AB, 161, 73/1 B, 432 A; 177/171, 172, 190, 246, 245; 116/114 M, 129 K; 350/110, 113

[56] References Cited

UNITED STATES PATENTS

| | | | |
|---|---|---|---|
| 2,906,118 | 9/1959 | Beyland | 73/141 R |
| 945,441 | 1/1910 | Bowers | 73/161 |
| 2,827,277 | 3/1958 | Dieter | 73/141 A X |
| 2,132,736 | 10/1938 | Jones | 73/433 |
| 2,667,064 | 1/1954 | Andersen et al | 73/76 |
| 3,360,994 | 1/1968 | Childress | 73/433 |

FOREIGN PATENTS OR APPLICATIONS

| | | | |
|---|---|---|---|
| 1,138,693 | 1/1957 | France | 73/141 R |

*Primary Examiner*—Charles A. Ruehl
*Attorney*—Molinare, Allegretti, Newitt & Witcoff

[57] ABSTRACT

The force gauge of this invention is adapted for use with the turntable of a phonograph. The gauge includes a base having a slotted end for receiving the spindle of the turntable. A balance beam is pivotally mounted on the base having on one end a number of grooves thereon to receive the stylus and on the other end a calibrated scale and a weight slidable along the scale. A mirror is secured to the base near the slot for reflecting the image of the balance beam end piece when it is aligned with an end piece affixed to the base.

8 Claims, 3 Drawing Figures

INVENTORS
ROBERT J. FUCHS,
JAMES P. THOMSEN
BY & BERNHARD W. JAKOBS
Molinare, Allegretti,
Newitt & Witcoff
ATTORNEYS

STYLUS TRACKING FORCE GAUGE

BACKGROUND OF THE INVENTION signals

High-quality turntables for phonographs are generally provided with a phonograph tone arm for carrying the needle or stylus which contacts the grooves of a record on the turntable. It is crucial, in delivering a noise free signal from the stylus which rides in the grooves of the record being played, to have precisely the right force exerted by the stylus against the grooves of the record. This force is commonly referred to as the tracking force. A force which is less than the desired level will prevent the stylus from properly tracking the record grooves. A force greater than the desired level will unduly wear away the grooves of the record and may generate spurious signal from the stylus.

In order to control this force, refined phonograph tone arms are generally provided with an adjustable counterweight at the end of the tone arm opposite the stylus end of the tone arm. When the counterweight is moved in one direction, a greater force is exerted by the stylus on the record grooves and when it is moved in the opposite direction, less force is exerted. This adjustment may also be accomplished by means of a spring affixed to the tone arm providing a force at the stylus.

The proper force for a given phonograph tone arm may be indicated by the specifications for the phonograph tone arm or may be determined by the particular operator of a given phonograph. Accordingly, it is desirable to provide a device for accurately measuring and adjusting the force exerted by the stylus. It is also desirable to provide such a device which is simple and economic to construct and easy to operate.

The stylus tracking force gauge of this invention provides such a device and includes a means for readily observing a particular force exerted by the stylus.

SUMMARY OF THE INVENTION

In a principal aspect, the present invention relates to a stylus tracking force gauge for use in conjunction with a turntable for a phonograph which comprises a base, a balance beam which is pivotally connected to the base and has a calibrated scale defined on one end of the beam and a stylus receiving groove defined on the other end of the beam. A weight is secured for movement along the calibrated scale of the beam so that when the beam is balanced by the opposing forces of the stylus and the weight, the force exerted by the stylus may be easily determined by observation of the position of the weight along the scale.

In a preferred embodiment, a fixed first indicator piece is secured to the base adjacent the balance beam and a second indicator piece is secured to the scale end of the balance beam so that when the beam is balanced, the indicator pieces are aligned. A mirror is secured to the base for reflecting the image of the indicator pieces for ready observation. Alignment of the indicators signifies that the beam is in balance and the reading under the calibrated weight is the tracking force.

BRIEF DESCRIPTION OF THE DRAWINGS

There follows a brief description of the drawings showing a preferred embodiment of the present invention wherein like numerals refer to like elements and wherein.

DETAILED DESCRIPTION OF THE PREFERRED EMBODIMENT

Figure 1:
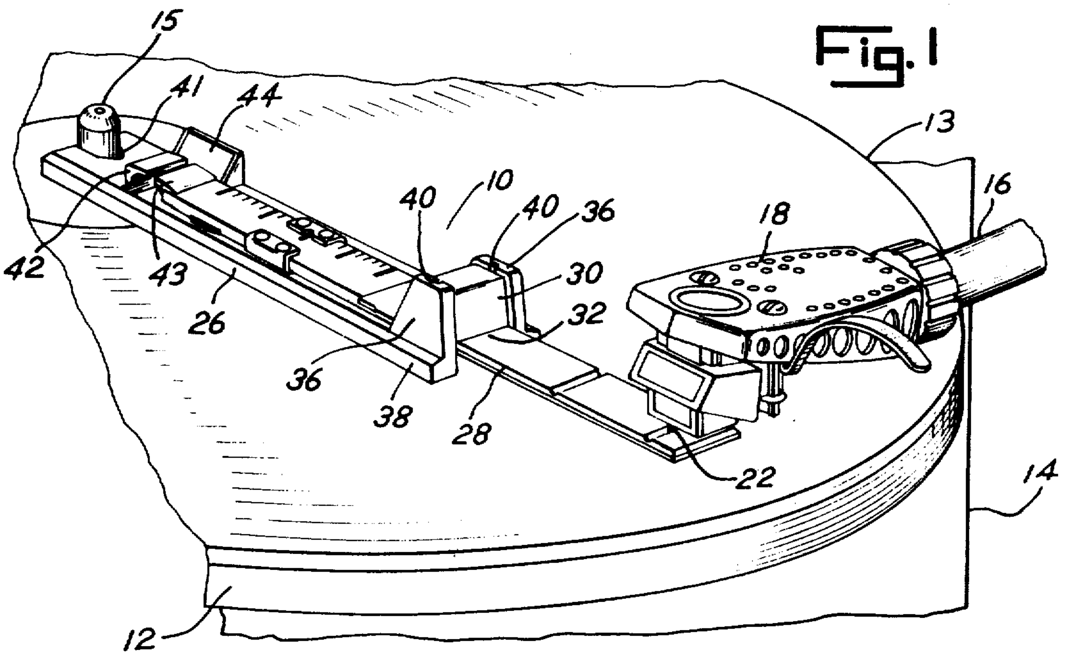
FIG. 1 is a perspective view of the stylus tracking force gauge of this invention in place on a turntable of a phonograph.

As shown in FIG. 1, the stylus tracking force gauge 10 of this invention rests upon a turntable 12 of a phonograph 13. The turntable 12 is rotatably secured to a turntable base 14 and a spindle 15 is connected to the center of turntable 12 for centering a record (not shown) on the turntable 12. A tone arm 16 is connected to the turntable base 14 in a manner well known in the art. The tone arm 16 includes a stylus carrying end 18.

The stylus carrying end 18 has secured therein a stylus or needle 22 which rides on the grooves of a record (not shown) to be played and delivers a signal from the stylus for amplification. It is crucial in phonographs of high quality to have a particular and determinable force exerted by the tone arm 16 through the stylus 22 onto the record (not shown). The stylus tracking force gauge 10 of this invention provides a means for readily determining the force exerted by the stylus 22 on a record (not shown).

The stylus tracking force gauge 10 includes a base 26 which may be formed of plastic or other durable material and a balance beam 28 which may be formed of a metallic alloy, although its particular composition is not crucial.

The balance beam 28 is pivotally seated in the base 26 in the following manner. A pin housing 30 of plastic or other suitable material is secured to the central section 32 of the balance beam 28. A pin 34 is connected to the pin housing 30 and projects outwardly from either side of the pin housing 30 at angles substantially perpendicular to the longitudinal axis of the balance beam 28.

Pin receiving arms 36 are secured to the base 26 at the pivoting end 38 of the base 26 and may be integrally formed thereon. The pin receiving arms 36 have a pair of notched channels 40 defined therein for receiving the pins 34. When the balance beam 28 is mounted on the base 26 with the pins 34 secured in the notched channels 40 of the pin receiving arms 36, the balance beam 28 may be pivoted in relation to the base 26. Defined in the base 26 is a slot 41 adapted to receive the spindle 15 of turntable 12. When the spindle 15 is secured within slot 41, the force gauge 10 is mounted for use on the turntable 12 and projects radially thereon.

A means for visually determining when the beam 28 is balanced is provided. This means includes a fixed first indicator piece 42 secured to the base 26 which may be integrally formed with the base 26 and a second indicator piece 43 secured to the end of balance beam 28.

To facilitate the observation of the alignment of end pieces 42 and 43 by the operator, a mirror 44 is secured to the base 26 adjacent the end pieces 42 and 43. The mirror 44 is secured at a predetermined angle away from the vertical so that the image of the first and second indicator pieces 42 and 43 is reflected upwardly. In this manner, the alignment of these indicator pieces 42 and 43 may be easily observed by the operator from a position above the turntable 12. In order to accurately determine alignment without the mirror 44 it would be necessary for the operator to observe the alignment of the first and second indicator pieces 42 and 43 from a position close to the plane of the surface of the turntable 12. With the mirror 44, this alignment may be easily observed by the operator while standing in the upright position.

Figure 2:
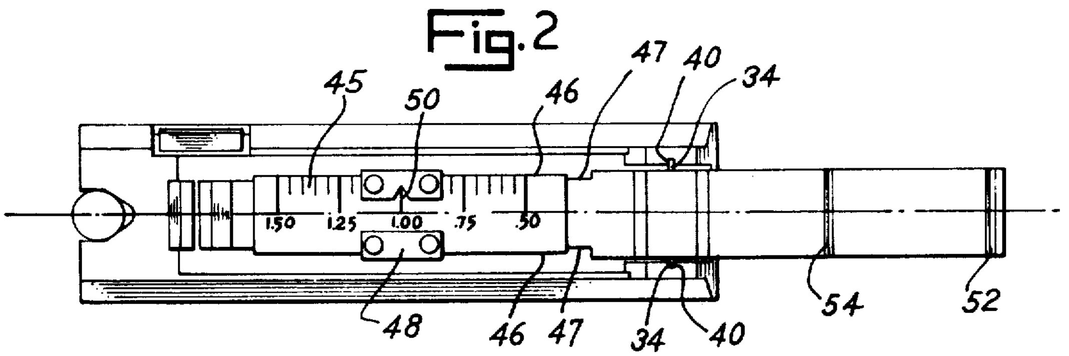
FIG. 2 is a top view of the stylus tracking force gauge shown in FIG. 1.

As may be seen more clearly in FIG. 2, a calibrated scale 45 is secured to one end of the balance beam 28. In the preferred embodiment, the calibrated scale 45 may be read increments of .05 grams with the range of the scale running from .50 grams up to 1.50 grams. The calibrated scale 45 is a metal strip having flanges 46 which fit complementary with the edge runs 47 of the balance beam 28.

A rider weight 48 is secured to the balance beam 28 for movement therealong. A notch 50 is defined in the rider weight 48 for indicating the desired stylus tracking force on the calibrated scale 45. The rider weight 48 may be moved along the balance beam 28 in relation to the calibrated scale 45 to set the desired stylus tracking force. As shown in FIG. 2, the weight is set for 1.00 grams of desired tracking force.

Figure 3:
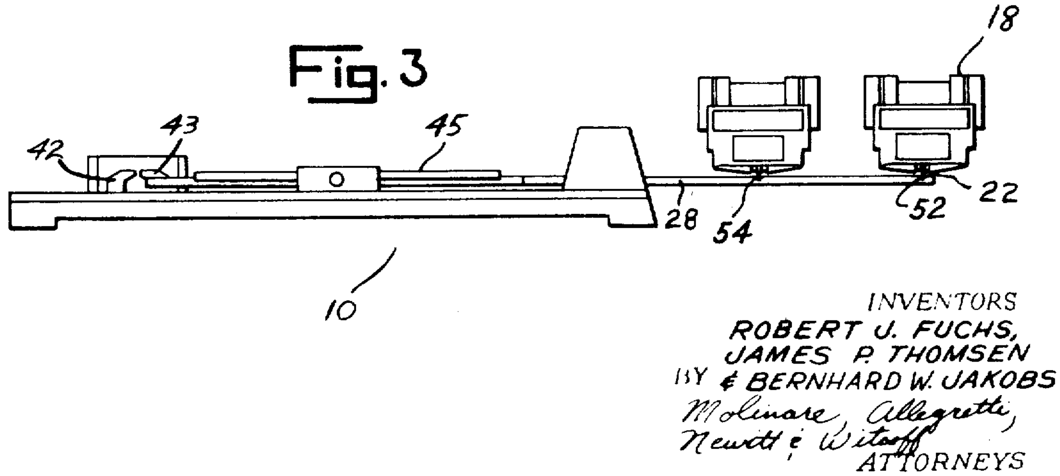
FIG. 3 is a side view of the stylus tracking force gauge shown in FIG. 1.

In the side view of FIG. 3, the stylus carrying end 18 of the tone arm 16 is positioned so that the stylus 22 fits into a groove 52 across one section of the balancing beam 28. The first indicator piece 42 is aligned with the second indicator piece 43. This means that the force exerted by the stylus 22 is that force shown on the calibrated scale 45 of the stylus tracking force gauge 10 of this invention.

In order to extend the effective range of the scale 45, a second groove 54 has been provided on the balance beam 28 half way between the pins 34 and the first groove 52. When the stylus 22 is set into the second groove 54, the calibrated scale 45 may be correctly read by multiplying its given value in the notch 50 by a factor of 2. Thus, the overall range of the calibrated scale 45 is doubled. Other grooves may, of course, be added on the beam 28 to further extend and vary the range of the calibrated scale 45.

While in the foregoing there has been described a complete preferred embodiment of the present invention, a procedure for the operation of this invention will be described as follows.

In the operation of the force gauge 10, the pins 34 of the balance beam 28 are set into the notched channels 40 of the pin receiving arms 36 with the groove 52 to the right of the pins 34 as shown in the top view of FIG. 2. The base 26 is then positioned on the turntable 12 with the spindle 15 of the turntable 12 passing through the slot 41 at the end of the base 26. This allows the gauge 10 to fit snugly on the turntable 12 and project radially from the spindle 15 to a point where stylus 22 may be easily mounted on the beam 28. When the stylus force gauge is positioned as described, the grooves 52 and 54 on balance beam 28 are aligned in the same direction as a record groove or a record (not shown) when the record is mounted on the turntable 13. This design requires that the grooves 52 be defined perpendicular to the longitudinal axis of the gauge 10 as shown by a broken line in FIG. 2.

The rider weight 48 is then adjusted along the balance beam 28 to a position where the desired stylus tracking force on the calibrated scale 45 is shown in the notch 50. Next stylus 22 is placed into the groove 52 of the beam 28 and the tone arm 16 adjusted until the first and second indicator pieces 42 and 43 are aligned. As has been pointed out, this alignment is achieved when the force exerted by the stylus 22 is that read on the calibrated scale 45 in the notch 50 of the rider weight 48.

It should be understood from the foregoing that in addition to being able to adjust the tone arm 16 to provide a desired stylus tracking force from the stylus 22, the force from a tone arm 16 may be accurately determined by the stylus tracking force gauge 10 of this invention. This may be done by placing the stylus 22 in the groove 52 of the balance beam 28 and moving the rider weight 48 along the calibrated scale 45 until alignment of the first and second indicator pieces 42 and 43 is achieved. When alignment is achieved, the force exerted by the stylus 22 is read in the notch 50 of the rider weight 48.

While in the foregoing there has been described a preferred embodiment of the present invention, it should be understood that other embodiments of this invention may be made by those skilled in the art without departing from the true spirit and scope of this invention.

What is claimed is:

1. A stylus tracking force gauge for use in conjunction with a turntable for a phonograph including a spindle comprising, in combination:

a base having a slot defined in one end of said base, said slot being adapted to receive said spindle therein such that said gauge projects radially on said turntable when said spindle is secured within said slot;

a balance beam pivotally seated in said base having a calibrated scale defined on one end thereof and a first groove defined on the other end thereof for receiving said stylus; and a weight secured for movement along said scale such that the force exerted by said stylus is read by the position of said weight on said scale when said beam is balanced by the opposing forces of said stylus and said weight.

2. The gauge as set forth in claim 1 including a first indicator piece connected to said base adjacent said one end of said beam and a second indicator piece connected to said one end of said beam to align with said first indicator piece when said beam is balanced.

3. The stylus tracking force gauge of claim 1 including a plurality of grooves defined on said other end of said balance beam for receiving said stylus such that the effective range of said scale may be extended.

4. The stylus tracking force gauge of claim 1 wherein said groove is defined perpendicular to the longitudinal axis of said gauge.

5. A stylus tracking force gauge for use in conjunction with a turntable for a phonograph comprising, in combination:

a base;

a balance beam pivotally seated in said base having a calibrated scale defined on one end thereof and means for receiving said stylus on the other end thereof;

a first indicator piece connected to said base adjacent said one end of said beam;

a second indicator piece connected to said one end of said beam to align with said first indicator piece when said beam is balanced;

an image reflective surface connected to said base adjacent said first indicator piece at a predetermined angle such that the image of said first and second indicator pieces is reflected upwardly for ready observation from a position above said turntable; and a weight secured for movement along said scales such that the force exerted by said stylus is read by the position of said weight on said scale when said beam is balanced by the opposing forces of said stylus and said weight.

6. The gauge as set forth in claim 5 wherein said turntable includes a spindle and wherein a slot is defined in one end of said base, said slot being adapted to receive said spindle therein such that said gauge projects radially on said turntable when said spindle is secured within said slot.

7. The stylus tracking force gauge of claim 5 wherein said means for receiving said stylus includes a plurality of grooves defined on said other end of said balance beam such that the effective range of said scale may be extended.

8. The stylus tracking force gauge of claim 7 wherein said grooves are defined perpendicular to the longitudinal axis of said gauge.

* * * * *